Figure 1:
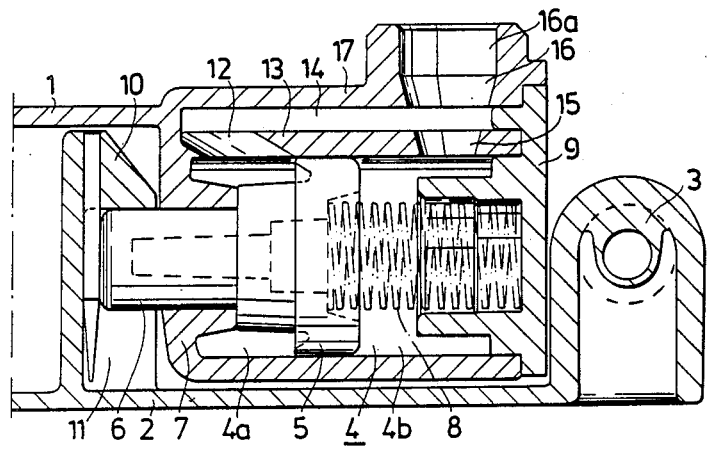

United States Patent [19]

Stoltz et al.

[11] Patent Number: 4,635,978
[45] Date of Patent: Jan. 13, 1987

[54] LOCKING DEVICE WHICH CAN BE OPENED BY MEANS OF A PRESSURIZED FLUID AND A PRESSURIZED-FLUID NOZZLE THEREFOR

[76] Inventors: Klas Stoltz, Majgardsvägen 5, S-141 44 Huddinge; Bo Gustavsson, Gökvägen 9, S-141 72 Huddinge; Kerstin Gustavsson, Väpnarvägen 40, S-145 72 Norsborg, all of Sweden

[21] Appl. No.: 579,956

[22] Filed: Feb. 14, 1984

[30] Foreign Application Priority Data

Feb. 24, 1983 [SE] Sweden ................... 8301034

[51] Int. Cl.⁴ .................. E05C 1/06; F01B 31/00
[52] U.S. Cl. .................. 292/144; 92/130 A; 92/163
[58] Field of Search ............ 292/144; 92/130 A, 163

[56] References Cited

U.S. PATENT DOCUMENTS

| | | | |
|---|---|---|---|
| 2,134,227 | 10/1938 | Forkardt | 92/163 X |
| 2,310,887 | 2/1943 | Andersen | 292/144 X |
| 3,605,409 | 9/1971 | Heese et al. | 92/163 X |
| 3,624,761 | 11/1971 | Kohn | 292/144 |
| 4,018,140 | 4/1977 | Engle | 92/130 A X |
| 4,085,960 | 4/1978 | Sherman | 292/144 X |
| 4,483,049 | 11/1984 | Gustavsson | |

Primary Examiner—Robert L. Wolfe
Assistant Examiner—Russell W. Illich
Attorney, Agent, or Firm—Browdy and Neimark

[57] ABSTRACT

A locking arrangement is provided which can be released from its locking state by means of a pressurized fluid, and to a nozzle through which pressurized fluid can be supplied to the locking arrangement to release the same. The locking arrangement includes a latch bolt (6) which is connected to a plunger (5) arranged for axial movement in a chamber (4), the plunger dividing the chamber into two, substantially pressure-tight part chambers (4a, 4b). The plunger (5) is biassed towards its locking position by a spring means (8) and can be moved axially to a lock release position, against the force of the spring means by a pressurized fluid, e.g. compressed air, lead into the one part chamber (4a). To this end, the aforesaid one part chamber (4a) communicates via an opening (12) in a chamber wall (13) with a fore-chamber (14) which is located externally of the chamber (4) and which communicates with the other part chamber (4b) through a second opening (15) in the aforesaid chamber wall (13). The opposite external wall (17) of the fore-chamber (14) is provided with a third through-passing opening (16) which is located opposite the aforesaid second opening (15). The nozzle (18) according to the invention is formed so as to enable it to be inserted into the aforementioned second and third openings (15, 16), so as to seal the same with its outer surfaces. The nozzle (18) has a first, internal channel (27, 23, 24) through which pressure fluid can be passed into the fore-chamber (14) from a pressure-fluid line connected to the nozzle, and a second, internal channel (20, 21) through which the other part chamber (4b) is placed in communication with the surroundings.

3 Claims, 3 Drawing Figures

LOCKING DEVICE WHICH CAN BE OPENED BY MEANS OF A PRESSURIZED FLUID AND A PRESSURIZED-FLUID NOZZLE THEREFOR

The present invention relates to a locking device which can be opened by menas of a pressurized fluid, for example compressed air, and also to a nozzle for supplying pressure fluid to such a locking device, for the purpose of opening the same.

The locking device according to the invention has primarily been developed for use in connection with such anti-theft labelling or alarm devices as those intended for fastening to an article or to an object and locked in their attached position, in a manner such that the devices can only be removed from the article or the object by authorized personnel, equipped with a special tool herefor. The locking device according to the invention, however, is not restricted to such use, but can be applied in all cases where there is required a simple inexpensive locking device which cannot be forced and which can be readily opened by an authorized person, with the aid of a relatively simple and inexpensive unlocking means.

In the case of anti-theft labelling and alarm devices of the aforesaid kind, and indeed in many other cases, there is need for a locking device which is of simple and inexpensive manufacture, but which, at the same time, cannot be readily released from its locked state without the use of a special tool therefor. On the other hand, an authorized person should be able to open such a device relatively quickly, with the aid of a relatively inexpensive tool.

The Swedish Patent Application No. 8101784-0 describes an anti-theft device which comprises a locking device which can be released by means of a pressurized fluid, such as compressed air, and which satisfies the aforesaid requirements in many ways. The present invention relates to an improvement on this known device, in which it is made much more difficult for an unauthorized person to open the locking device without making the device more complicated and more expensive to any great extent, and also without appreciably increasing the cost of the special tool for the authorized unlocking of the locking device.

The characterizing features of the locking device according to the invention and of the special nozzle for supplying pressurized fluid to the locking device when releasing said device from its locked state in an authorized manner are set forth in the following claims.

An exemplary embodiment of the invention will now be described in more detail with reference to the accompanying drawings, in which FIG. 1 is a schematic, axial sectional view of part of an anti-theft device fitted with a locking device according to the invention.

Figure 2:
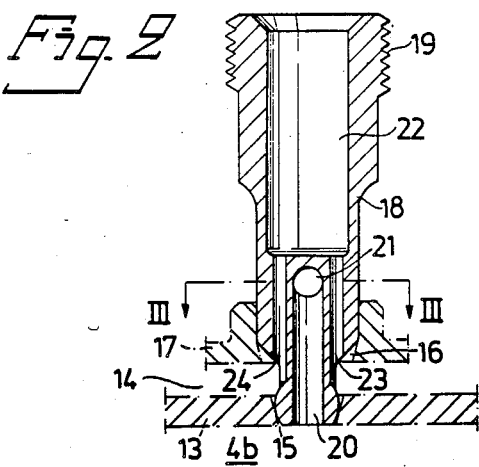
Figure 3:
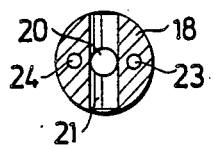

FIG. 2 is an axial sectional view of a pressurized-fluid nozzle for use in releasing the locking device in an authorized manner, and FIG. 3 is a radial sectional view of the nozzle taken on the line III—III in FIG. 2.

FIG. 1 illustrates part of an anti-theft device, which in principle may be of the kind described in Swedish Patent Application No. 8101784-0. The device is intended to be attached to an article of merchandise made of cloth or similar material, and is affixed to said article in a manner such that it can only be released and removed legitimately by authorized persons using a special tool herefor. The device comprises mainly two parts 1, 2 (only partially shown), which are joined together at one end of the device by means of a hinge arrangement 3, such that the device parts 1 and 2 form the jaws of a clamp-like arrangement, which can be placed around a piece of the article inserted between said parts 1, 2, whereupon when the parts 1, 2 are closed and metal pins (not shown) provided on said parts penetrate the cloth, so that the device is firmly fixed to said article. To enable the anti-theft device to be locked in its attached position on said article, in a manner which prevents it being removed therefrom by an unauthorized person, the anti-theft device is provided with a locking arrangement according to the invention.

This locking arrangement includes a lock housing formed in the part 1 and having a chamber 4 in which there is arranged an axially movable plunger 5. The plunger 5 is permanently connected to, or formed integrally with, a latch bolt 6 which projects through an opening in one end wall 7 of the chamber 4. The plunger 5 and latch bolt 6 are biassed towards the locking or catch position illustrated in FIG. 1, by means of a helical spring 8 arranged between the plunger 5 and the other end wall 9 of the chamber 4, said other end wall being irremovably connected to the lock housing in general. The latch bolt 6 is arranged to co-act with a catch pawe 10 with a rearwardly placed recess 11 in the other part 2 of said anti-theft device. When the two hinged parts 1, 2 of the device are clamped around an interlying portion of the article to be protected against theft, the spring biassed bolt 6 automatically snaps into the recess 11 behind the pawe 10, thereby automatically locking the device in its closed state.

The locking plunger 5 divides the chamber 4 into two, substantially pressure-tight part chambers 4a and 4b. The lock can only be released by forcing back the plunger 5, and therewith the latch bolt 6 from the locking position illustrated in FIG. 1, this being effected by introducing a pressurized fluid, such as compressed air, into the part chamber 4a, through an opening 12 located in the chamber wall 13 and discharging into the part chamber 4a, whereupon the plunger 5 is moved back by the increasing pressure in the chamber part 4a, against the action of the spring 8.

In the locking arrangement described and illustrated in the aforementioned Swedish Patent Application No. 8101784-0, the channel 12 connects directly with the surroundings, and hence with this design it is relatively easy to open the locking arrangement illegally, by simply introducing a suitable pressurized fluid, e.g. compressed air, through the channel 12 and into the part chamber 4a. This is not possible with the improved locking arrangement according to the invention.

Thus, in the improved locking arrangement, the channel 12 extending from the part chamber 4a is not in direct connection with the surroundings, but opens into a fore-chamber 14, which is located externally of the chamber wall 13 and which is formed integrally with the lock housing in general. This fore-chamber 14 also connects with the other part chamber 4b, through an opening 15 extending through the wall 13. The fore-chamber 14 also communicates with the surroundings, via an opening 16 passing through an outer wall 17 of the fore-chamber 14. The two openings 15 and 16 are located opposite one another.

It will be seen that the locking arrangement cannot be opened solely by introducing a pressurized fluid into the fore-chamber 14 through the opening 16, since the fore-chamber 14 is in communication with both part chambers 4a and 4b through the openings 12 and 15, and hence in such a case as equal pressure would prevail in both part chambers, consequently preventing the plunger from being moved away from its locking position. Since the plunger exhibits a much greater pressure area on the side thereof facing the part chamber 4b than on the side facing the part chamber 4a, the plunger 5, and therewith the latch bolt 6, would in reality be urged still more strongly in the locking direction should a pressurized fluid be introduced into the fore-chamber 14. Thus, in order to release the locking arrangement, it is not only necessary to pass a fluid of the requisite pressure into the part chamber 4a via the opening 12, the fore-chamber 14 and the opening 16, but also to ensure that the pressurized fluid does not at the same time enter the part chamber 4b through the opening 15. Consequently, the opening 15 must be sealed against the pressurized fluid medium entering the fore-chamber 14 through the opening 16. However, this alone is not sufficient to enable the lock to be released, since the plungers cannot be forced back by the positive pressure acting in the chamber part 4a, unless the air present in the chamber part 4b, is given the opportunity to escape from the chamber part 4b, when the plunger is urged away from its locking position. This can only be effected through the opening 15, since the chamber part 4b is essentially pressure-tight in all other respects. Consequently, in order to release the locking arrangement there is required a nozzle of special design, which can be inserted into the two mutually opposite openings 16 and 15 from the outside, and which permits the pressure fluid to be introduced into the fore-chamber 14 without said fluid being able to flow into the part chamber 4b through the opening 15, while permitting, at the same time, air to flow from the part chamber 4b to the surroundings, via the openings 15 and 16.

FIGS. 2 and 3 illustrate a nozzle particularly designed for this purpose, the walls 13 and 17 having the openings 15 and 16 in the locking arrangement being shown in broken lines. The nozzle 18 is formed at one end thereof, its rear end, to connection, e.g. via an external screw hread 19, with a hose for supplying pressure fluid to the device. The other end of the nozzle, i.e. its front end, is formed to enble it to be inserted into the mutually opposite openings 15 and 16 located in the chamber wall 13 and the outer wall 17 of the fore-chamber 14, respectively. In this respect, the front end of the nozzle 18 is so formed, as shown in FIG. 1, that the outer cylindrical surface of the nozzle seals against both the wall of opening 15 and the wall of opening 16. In order to facilitate guiding of the nozzle 18 into the openings 15 and 16, and to seal the openings satisfactorily against the outer surfaces of the nozzle 18, the opening 16 may have a slightly larger diameter than the opening 15, and the opening 15 may taper slightly, inwardly, as may also the inner part of opening 16, said opening 16 having an outer cylindrical part 16a, as seen in FIG. 1.

The nozzle is also provided with a central axial channel 20, which extends from the tip of the nozzle and which is connected at its rear end with a transverse, through-passing channel 21, which opens into the outside of the nozzle 18, behind that part of the nozzle which is inserted into the opening 16 in the wall 17 of the fore-chamber 14, i.e. the channel 21 opens out into the surroundings. The nozzle 18 is also provided with a further axial channel 22 which extends from the rear end of the nozzle and thus connects with the pressure-fluid line connected to said rear end of the nozzle. At its forward end, the channel 22 communicates with two narrower, axially extending channels 23, 24, which open out on the outside of the nozzle 18, between that part of the nozzle which is sealingly inserted into the opening 15 and that part which is sealingly inserted into the opening 16, i.e. within the fore-chamber 14.

As will be understood, with a nozzle thus designed, it is possible to conduct pressurized fluid into the fore-chamber 14, through the channels 22, 23 and 24, while this fluid is prevented from flowing into the part chamber 4b through the opening 15, which is sealed vis-a-vis the fore-chamber 14 by the front end of the nozzle 18. The pressurized fluid is prevented from escaping from the fore-chamber 14 to the surroundings through the opening 16, since said opening is also sealed off by the nozzle 18. On the other hand, air present in the part chamber 4b is able to escape therefrom to the surroundings, through the channels 20, 21 in the nozzle. As a result, the plunger 5, together with the latch bolt 6, can be urged away from its locking position by the positive pressure generated in the part chamber 4a.

Because of the special design of the locking arrangement according to the invention and the associated nozzle according to the invention, it is extremely difficult to open the lock by unauthorized means. On the other hand the locking arrangement can be released from its locking state extremely easily and quickly with the use of said nozzle connected to a suitable source of fluid under pressure. As will be understood, only authorized personnel will have access to the special nozzle required for opening the locking arrangement. Both the locking arrangement and the nozzle are of relatively simple construction and can be manufactured relatively cheaply, but the manufacture of the nozzle requires knowledge of the exact dimensions of the nozzle to be used for opening the locking arrangement which is advantageous for the security of the system.

It will be understood that although described and illustrated with reference to one form thereof, the locking arrangement and the nozzle according to the invention can be modified in several respects, within the scope of the invention. For example, the openings 15 and 16 and the nozzle fitting thereinto can have forms other than those illustrated and described, the only condition being that the nozzle provides the necessary seal in said openings. This effect can also be achieved, for example, by providing the nozzle with suitable elastic seals.

We claim:

1. A locking system including at least one lock and at least one pneumatically operable opening means for said lock; said lock comprising:

a latch bolt having a locked position and an unlocked position, a cylinder with a cylinder wall and sealed end walls, a plunger arranged for axial movement within said cylinder and dividing the interior thereof into a first cylinder chamber and a second cylinder chamber, said plunger being connected to said latch bolt, spring means urging said plunger in a direction towards a first terminal position in said cylinder corresponding to said locked position of said latch bolt, a fore-chamber located externally of said cylinder and separated from the interior thereof by said cylinder wall, a first through-passing opening provided in said cylinder wall between said first cylinder chamber and said fore-chamber, and a second through-passing opening provided in said cylinder wall between said second cylinder chamber and said fore-chamber, and a third through-passing opening provide in an external wall of said fore-chamber between said fore-chamber and the surrounding atmosphere, said third through-passing opening being located in alignment with said second through-passing opening in said cylinder wall;

and said opening means comprising:

an elongate nozzle separate from and freely movable relative to said lock, said nozzle having a first end formed for connection to a source of pressurized gas and a second end manually and removably insertable into said second and third, mutually aligned openings of said lock, said second end of the nozzle having an external surface including a first annular surface portion locate close to the extremity of said second end of the nozzle and formed to provide a sealing fit in said second opening of the lock when inserted therein, and a second annular surface portion axially spaced from said first annular surface portion and formed to provide a sealing fit in said third opening of the lock when inserted therein, and said nozzle further having at least one first internal channel extending from said pressurized gas source connection and opening into said external surface of the nozzle between said first and second annular portions, and at least one second internal channel extending from an axial opening at the extremity of said second end of the nozzle and opening into the external surface of the nozzle between said second annular surface portion and said first end of the nozzle.

2. A locking arrangement as claimed in claim 1, wherein said second and third openings are circular in cross-section and arranged co-axial with one another.

3. A locking arrangement as claimed in claim 1, wherein said second and third openings taper conically inwards.

* * * * *